UNITED STATES PATENT OFFICE.

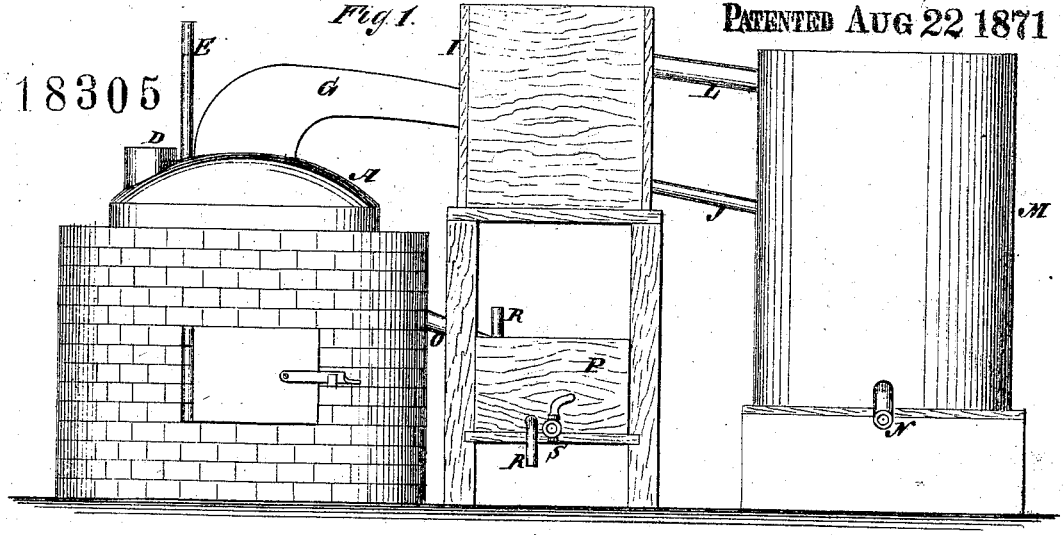
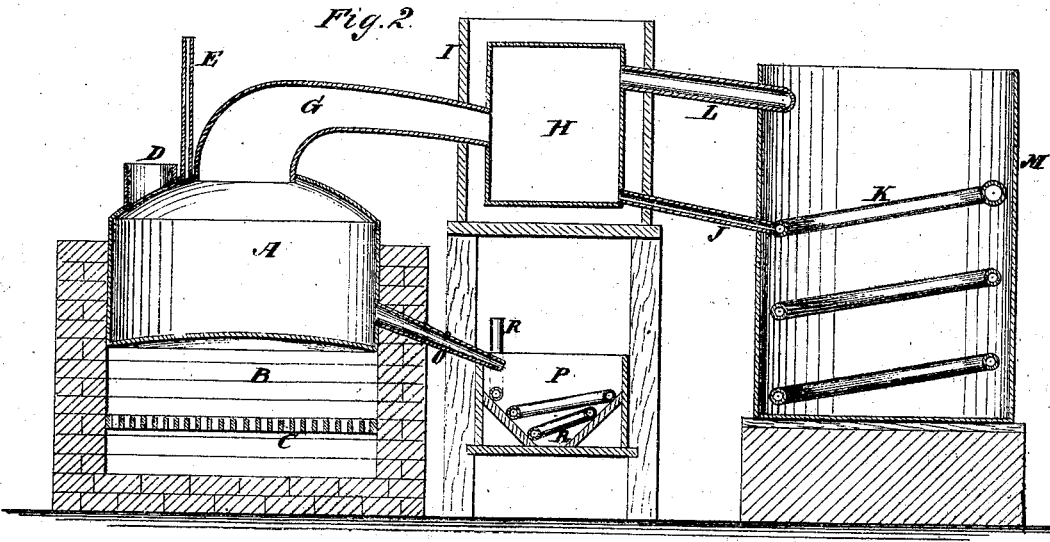
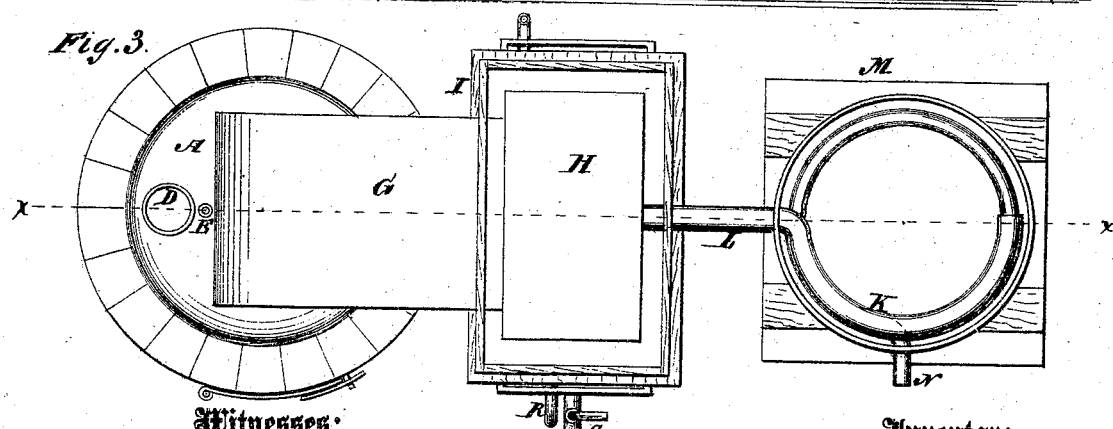

ADRIAN H. VAN BOKKELEN, OF WILMINGTON, NORTH CAROLINA.

IMPROVEMENT IN APPARATUS FOR DISTILLING TURPENTINE.

Specification forming part of Letters Patent No. 118,305, dated August 22, 1871.

*To all whom it may concern:*

Be it known that I, ADRIAN H. VAN BOKKELEN, of Wilmington, in the county of New Hanover and State of North Carolina, have invented a new and useful Improvement in Apparatus for Distilling Turpentine; and I do hereby declare that the following is a full, clear, and exact description thereof, which will enable others skilled in the art to make and use the same, reference being had to the accompanying drawing forming part of this specification.

My invention consists in the improvement of turpentine-stills, as hereinafter fully described and subsequently pointed out in the claim.

In the accompanying drawing, Figure 1 is a side elevation. Fig. 2 is a vertical section taken on the line $x\ x$ of Fig. 3. Fig. 3 is a top or plan view.

Similar letters of reference indicate corresponding parts.

A is the vessel or retort supported by masonry above the fire-box B, in which the crude turpentine is vaporized. C represents the grate of the fire-box. The crude turpentine is introduced into the retort A through the aperture D. E is a steam-pipe from a steam-generator, by means of which steam is discharged into the retort during the process of distilling. The vapors or products of distillation pass off through the neck G into the condensing-chamber H. This chamber H is supported in a water-tank, I. Water is pumped or discharged into the tank near its bottom, and rises so as to entirely surround the chamber. As the water is discharged into the bottom of the tank, or near the bottom, it will rise, and the heated water will flow over the top. A constant circulation is thus kept up and the heat absorbed from the vapors is carried off. In this manner a large portion of the vapor is condensed and passes from the condenser through the pipe J into the coil or worm K, but the lighter and more volatile products of the distillation will pass off from the condenser through the pipe L from near the top of the tank into the same worm K. This worm is placed in the tank M. Cold water is discharged into the bottom or lower portion of the tank, surrounding the worm as it rises, and overflows or is conducted off from the top, so that all the remaining vapor is condensed in the worm and the liquid turpentine is discharged from its end N through the side of the tank, as seen in Fig. 3. The residue of the crude turpentine in the retort passes from the retort through the pipe O into the receiving-vessel P. R represents a steam-pipe, which is coiled or made to pass back and forth on or near the bottom of the vessel P, by means of which the liquid resin is maintained at a high temperature until it is discharged from the vessel through the pipe S.

The jet of steam which is passed into the retort through the pipe E is discharged near the bottom of the retort and beneath the crude turpentine therein. The effect of this discharge of steam into the retort is the crude turpentine is vaporized or distilled at a much lower temperature than by the old process, the product of pure turpentine is increased, and the residue or resin passes off without being discolored by the high temperature hitherto employed in the distillation of turpentine.

The result of my improvement is an increased yield of pure turpentine, a superior quality of resin, and great economy in fuel, either of which advantages is of the utmost importance to the distiller of turpentine.

Having thus described my invention, I claim as new and desire to secure by Letters Patent—

1. A condensing-chamber, H, having two discharge-pipes, L J, and surrounded by a water-chamber, I, in which a cold current is constantly being received at the bottom and discharged over the top, for the purpose of condensing the less volatile vapor and passing it through the pipe J, while the more volatile products of distillation pass through the upper pipe L, as described.

2. In combination, with a steam and fire-still, A B E, the condenser H, pipes H L, coil K, resin-receptacle P, and coil R, all combined and arranged as and for the purpose specified.

3. The resin-receptacle P, combined with the coil of steam-pipe R placed within it, as and for the purpose specified.

ADRIAN H. VAN BOKKELEN.

Witnesses:
E. H. M. QUIGG,
A. A. MOULEY.